US012283782B2

(12) United States Patent
Sekine

(10) Patent No.: US 12,283,782 B2
(45) Date of Patent: Apr. 22, 2025

(54) ELECTRONIC COMPONENT

(71) Applicant: IRISO ELECTRONICS CO., LTD., Yokohama (JP)

(72) Inventor: Takashi Sekine, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 281 days.

(21) Appl. No.: 17/897,540

(22) Filed: Aug. 29, 2022

(65) Prior Publication Data

US 2023/0063034 A1 Mar. 2, 2023

(30) Foreign Application Priority Data

Aug. 30, 2021 (JP) ................................ 2021-140180

(51) Int. Cl.

*H01R 24/40* (2011.01)
*H01R 13/24* (2006.01)
*H01R 13/508* (2006.01)
*H01R 13/52* (2006.01)
*H01R 103/00* (2006.01)

(52) U.S. Cl.

CPC ......... *H01R 24/40* (2013.01); *H01R 13/2407* (2013.01); *H01R 13/508* (2013.01); *H01R 13/5202* (2013.01); *H01R 2103/00* (2013.01)

(58) Field of Classification Search

None
See application file for complete search history.

(56) References Cited

U.S. PATENT DOCUMENTS 10,205,285 B2 * 2/2019 Sasaki .................... H04N 23/57
10,601,191 B2 * 3/2020 Yamazaki .............. H01R 24/54
2013/0045631 A1 2/2013 Wang
2018/0006407 A1 1/2018 Sasaki
2019/0028618 A1 1/2019 Bippus et al.
2019/0103716 A1 4/2019 Yamazaki
2020/0145560 A1 5/2020 Han

FOREIGN PATENT DOCUMENTS

EP 3462550 A1 4/2019
JP 2018006162 A 1/2018
JP 2020525840 A 8/2020
JP 2020150727 A 9/2020
JP 2020165513 A 10/2020
JP 2021100853 A 7/2021
WO 2017125164 A1 7/2017

OTHER PUBLICATIONS

Extended European Search Report, for European Patent Application No. 22192520.9, dated Jan. 25, 2023, 7 pages.
Translation of Japanese Office Action for Japanese Application No. 2021-140180, dated Feb. 26, 2025, 7 pages.

* cited by examiner

*Primary Examiner* — Tho D Ta

(74) *Attorney, Agent, or Firm* — Westman, Champlin & Koehler, P.A.

(57) ABSTRACT

A second component (electronic component) includes a second housing, an inner conductor, an outer conductor, and an internal shell. The second housing forms the storage space together with the first housing by being attached to the first housing. The outer conductor has a cylindrical shape and annularly surrounds the inner conductor and extends in the first direction. The internal shell is disposed inside the storage space and electrically connected to the outer conductor. The internal shell has a spring piece that makes elastic contact with the outer conductor.

7 Claims, 11 Drawing Sheets

ELECTRONIC COMPONENT

CROSS-REFERENCE TO RELATED APPLICATION

This application claims priority under 35 USC 119 from Japanese Patent application No. 2021-140180 filed on Aug. 30, 2021, the disclosure of which is incorporated by reference herein in its entirety.

BACKGROUND

Technical Field

The present disclosure relates to an electronic component.

Related Art

An electronic component (connector module) disclosed in Japanese Patent Application Laid-Open No. 2018-06162 includes a housing (connector case), an inner conductor (center conductor), an outer conductor (conductive shell), and an internal shell (shield case). The housing is attached to another component (body case) to form a storage space together with the other component. The inner conductor extends along a first direction and electrically connects a first connection object (coaxial cable) outside the storage space to a second connection object (receptacle) inside the storage space. The outer conductor has a cylindrical shape and covers the inner conductor from a direction perpendicular to the first direction. The internal shell is disposed inside the storage space and electrically connected to the outer conductor (conductive shell).

SUMMARY OF THE INVENTION

Here, in the foregoing electronic device, the internal shell and the outer conductor are joined to each other, thereby ensuring an electrical connection between the internal shell and the outer conductor. Therefore, in manufacturing the electronic device, a process for joining the internal shell and the outer conductor is necessary.

An object of the present disclosure is to ensure, in an electronic component that includes an outer conductor and an internal shell that are electrically connected to each other, a favorable electrical connection between the internal shell and the outer conductor without joining the internal shell and the outer conductor.

An electronic component according to a first embodiment is an electronic component that includes: a housing that is attached to another component to form a storage space together with the other component; an inner conductor that extends along a first direction and electrically connects a first connection object outside the storage space and a second connection object inside the storage space; a cylindrical outer conductor that annularly surrounds the inner conductor and extends in the first direction; and an internal shell that is disposed inside the storage space and is electrically connected to the outer conductor, wherein the internal shell has a spring piece that makes elastic contact with the outer conductor.

In the foregoing embodiment, the electronic component includes a housing, an inner conductor, an outer conductor, and an internal shell. The housing is attached to another component to form a storage space together with the other component. The inner conductor extends along the first direction and electrically connects the first connection object outside the storage space and the second connection object inside the storage space. The outer conductor has a cylindrical shape and annularly surrounds the inner conductor and extends in the first direction. The internal shell is disposed inside the storage space and electrically connected to the outer conductor.

Here, the internal shell has a spring piece that makes elastic contact with the outer conductor. Therefore, it is possible to ensure a favorable electrical connection between the internal shell and the outer conductor without joining the internal shell and the outer conductor.

An electronic component according to a second embodiment is the electronic component according to the first embodiment, wherein the spring piece has a contact portion that makes contact with the outer conductor, and an elastic support portion that supports the contact portion, and wherein the elastic support portion extends in a direction perpendicular to the first direction.

In the foregoing embodiment, the spring piece includes a contact portion that makes contact with the outer conductor and an elastic support portion that supports the contact portion.

Here, the elastic support portion extends in a direction perpendicular to the first direction. Therefore, it is possible to secure, for the elastic support portion, a spring length necessary for displacement of the contact portion without increasing the size of the internal shell in the first direction.

An electronic component according to a third embodiment is the electronic component according to the second embodiment, wherein the internal shell has four spring pieces each having an elastic support portion, and wherein the elastic support portions of the four spring pieces extend toward the outer conductor from four positions in directions perpendicular to the first direction, and in mutually perpendicular directions, with respect to the outer conductor.

In the foregoing embodiment, the internal shell has four spring pieces. Further, the four elastic support portions of the four spring pieces extend toward the outer conductor from four positions in directions perpendicular to the first direction, and in mutually perpendicular directions, with respect to the outer conductor.

Therefore, a favorable electrical connection between the internal shell and the outer conductor can be more reliably ensured.

An electronic component according to a fourth embodiment is the electronic component according to the second or third embodiment, wherein the contact portion is formed by bending a distal end side of the elastic support portion toward the second connection object in the first direction.

In the foregoing embodiment, the contact portion is formed by bending the distal end side of the elastic support portion inward in the first direction (toward the second connection object in the first direction). Therefore, it is easy to attach the internal shell to the outer conductor from the inside in the first direction.

An electronic component according to a fifth embodiment is the electronic component according to the first embodiment, wherein the internal shell has a first plate portion along a plane perpendicular to the first direction, wherein the spring piece has a contact portion that makes contact with the outer conductor, and an elastic support portion that supports the contact portion, and wherein the elastic support portion extends from the first plate portion in a direction perpendicular to the first direction.

In the foregoing embodiment, the internal shell has a first plate portion along a plane perpendicular to the first direction. Furthermore, the spring piece includes a contact portion that makes contact with the outer conductor, and an elastic support portion that supports the contact portion.

Here, the elastic support portion extends from the first plate portion in a direction perpendicular to the first direction. Therefore, the first plate portion and the elastic support portion are located on substantially the same plane.

Accordingly, when the internal shell has the first plate portion, the spring length necessary for displacement of the contact portion can be ensured for the elastic support portion without increasing the size of the internal shell in the first direction.

An electronic component according to a sixth embodiment is the electronic component according to the fifth embodiment, wherein the first plate portion has an opening formed therein through which the outer conductor passes, wherein the contact portion is formed by bending a distal end side of the elastic support portion toward the second connection object side in the first direction, and wherein the contact portion and the outer conductor make contact, on a second connection object side, relative to the first plate portion.

In the foregoing embodiment, the first plate portion has an opening formed therein through which the outer conductor passes. Here, the contact portion is formed by bending the distal end side of the elastic support portion inward in the first direction. The contact portion and the outer conductor make contact, on the inside in the first direction, relative to the first plate portion.

Therefore, it is not necessary to secure a space for the contact portion and the outer conductor to make contact on the outside in the first direction of the first plate portion (the first connection object side in the first direction), and the entire electronic component can be downsized.

An electronic component according to a seventh embodiment is the electronic component according to the sixth embodiment, wherein the first plate portion has an extension portion that extends from a proximal end of the spring piece toward the opening so as to extend a shielding range.

In the foregoing embodiment, the first plate portion has an extension portion that extends from the proximal end of the spring piece toward the opening so as to extend the shielding range.

Therefore, a wide range can be shielded by the internal shell.

An electronic component according to an eighth embodiment is the electronic component according to any of the first to seventh embodiments, wherein the internal shell has a held portion that is held by the housing.

In the foregoing embodiment, the internal shell has a held portion that is held by the housing.

Therefore, the internal shell is appropriately held in comparison with an embodiment in which the internal shell does not have a held portion.

Note that, because the internal shell is held by the housing, the position of the internal shell is affected by the housing, and the positional relationship between the internal shell and the outer conductor may deviate from the desired positional relationship. However, because the internal shell has a spring piece, a favorable electrical connection between the internal shell and the outer conductor is ensured even when the positional relationship between the internal shell and the outer conductor deviates from the desired positional relationship.

An electronic component according to a ninth embodiment is the electronic component according to the eighth embodiment, wherein the internal shell has a first plate portion along a plane perpendicular to the first direction, and a side plate portion formed by bending an end portion of the first plate portion toward the second connection object in the first direction, and wherein the held portion is formed by forming, on the side plate portion, a press-fitting protrusion that is press-fitted into the housing.

In the foregoing embodiment, the internal shell has a first plate portion along a plane perpendicular to the first direction, and a side plate portion formed by bending an end portion of the first plate portion inward in the first direction (toward the second connection object in the first direction). Further, the held portion is formed by forming, on the side plate portion, a unpreserved protrusion that is press-fitted into the housing.

Thus, the internal shell can be held by the housing while suppressing increased complexity of the shape of the internal shell.

DETAILED DESCRIPTION OF THE INVENTION

Hereinafter, a description will be provided by assuming that the ±X direction illustrated in each drawing is the front-rear direction, the ±Y direction is the width direction, and the ±Z direction is the up-down direction.

Camera Module 10

Figure 1:
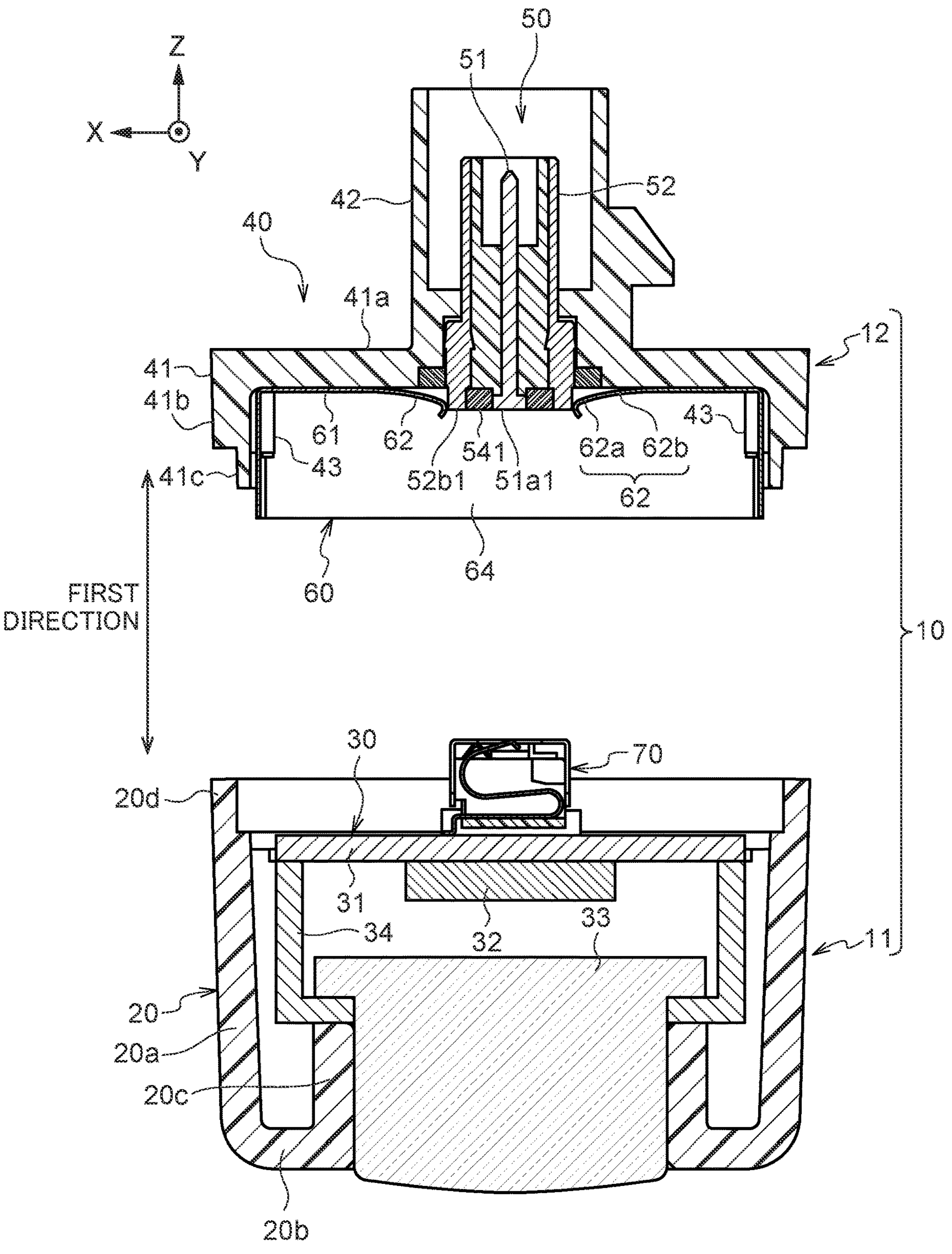
FIG. 1 is a cross-sectional view illustrating a state in which a first component and a second component constituting a camera module are separated.
Figure 2:
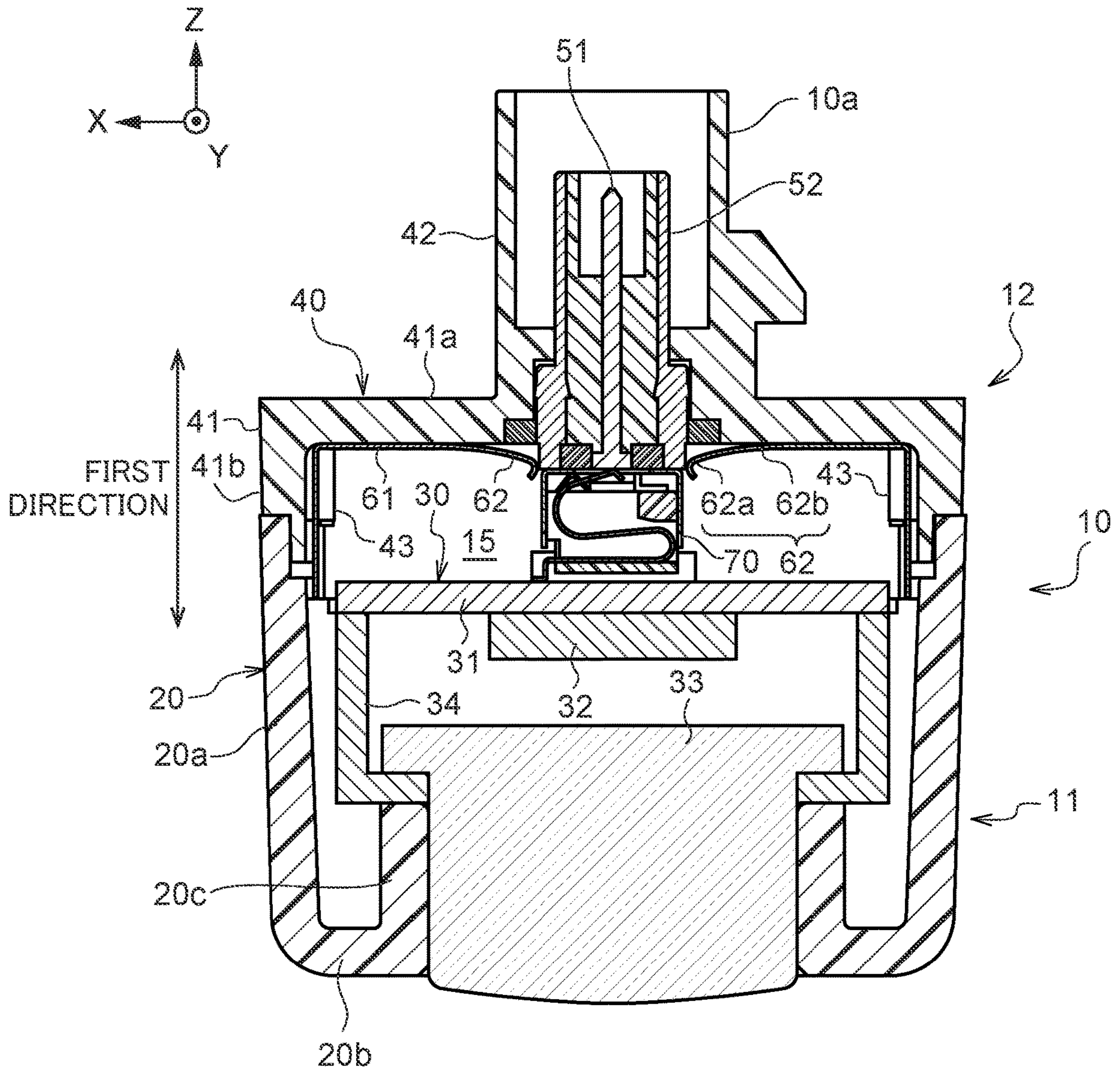
FIG. 2 is a cross-sectional view illustrating a completed state of the camera module.
Figure 8:
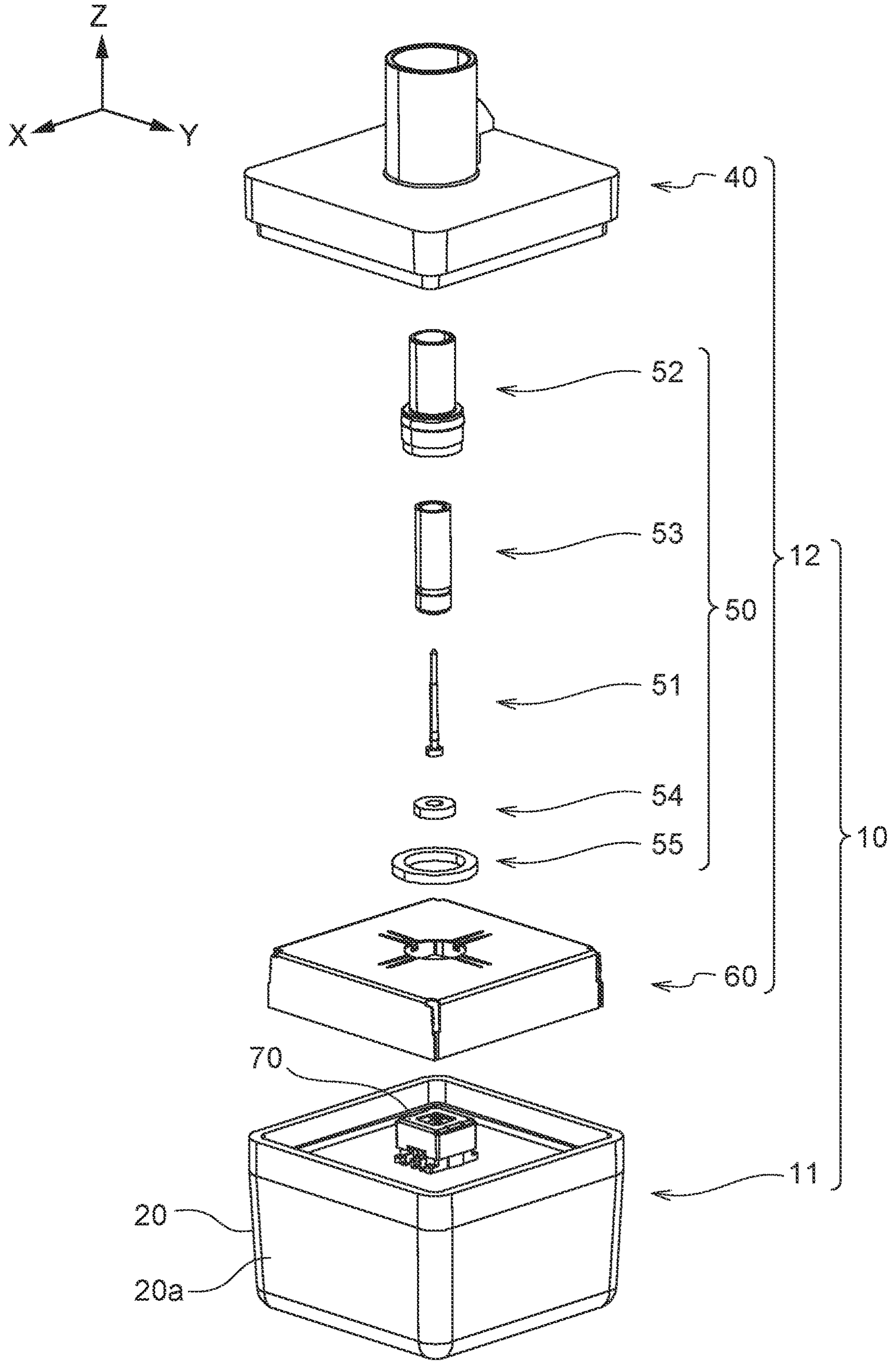
FIG. 8 is an exploded perspective view of the camera module (only the second component is exploded)

FIGS. 1, 2, and 8 illustrate a camera module 10.

The camera module 10 is configured to be connectable to an external connector (not illustrated) constituting a "first connection object" of a connecting portion 10*a* (see FIG. 2). The camera module 10 includes a first component 11 and a second component 12.

First Component 11

A first component 11 includes a first housing 20, an imaging unit 30, and an internal connector 70.

The first housing 20 is formed of an insulator such as synthetic resin, for example. The first housing 20 has a peripheral wall 20*a*, a bottom wall 20*b*, and a lens arrangement portion 20*c*. The peripheral wall 20*a* has a substantially square cylinder shape. The lens arrangement portion 20*c* has a cylinder shape. The bottom wall 20*b* is formed so as to connect the lower ends of the peripheral wall 20*a* and the lens arrangement portion 20*c*.

The imaging unit 30 includes an internal substrate 31, an imaging element 32, a lens 33, and a retainer 34. The internal substrate 31 is fixed to the first housing 20. The imaging element 32 is disposed on the lower surface of the internal substrate 31. The lens 33 is attached to the internal substrate 31 via the retainer 34 and is disposed on the inside of the lens arrangement portion 20*c* of the first housing 20.

Figure 4:
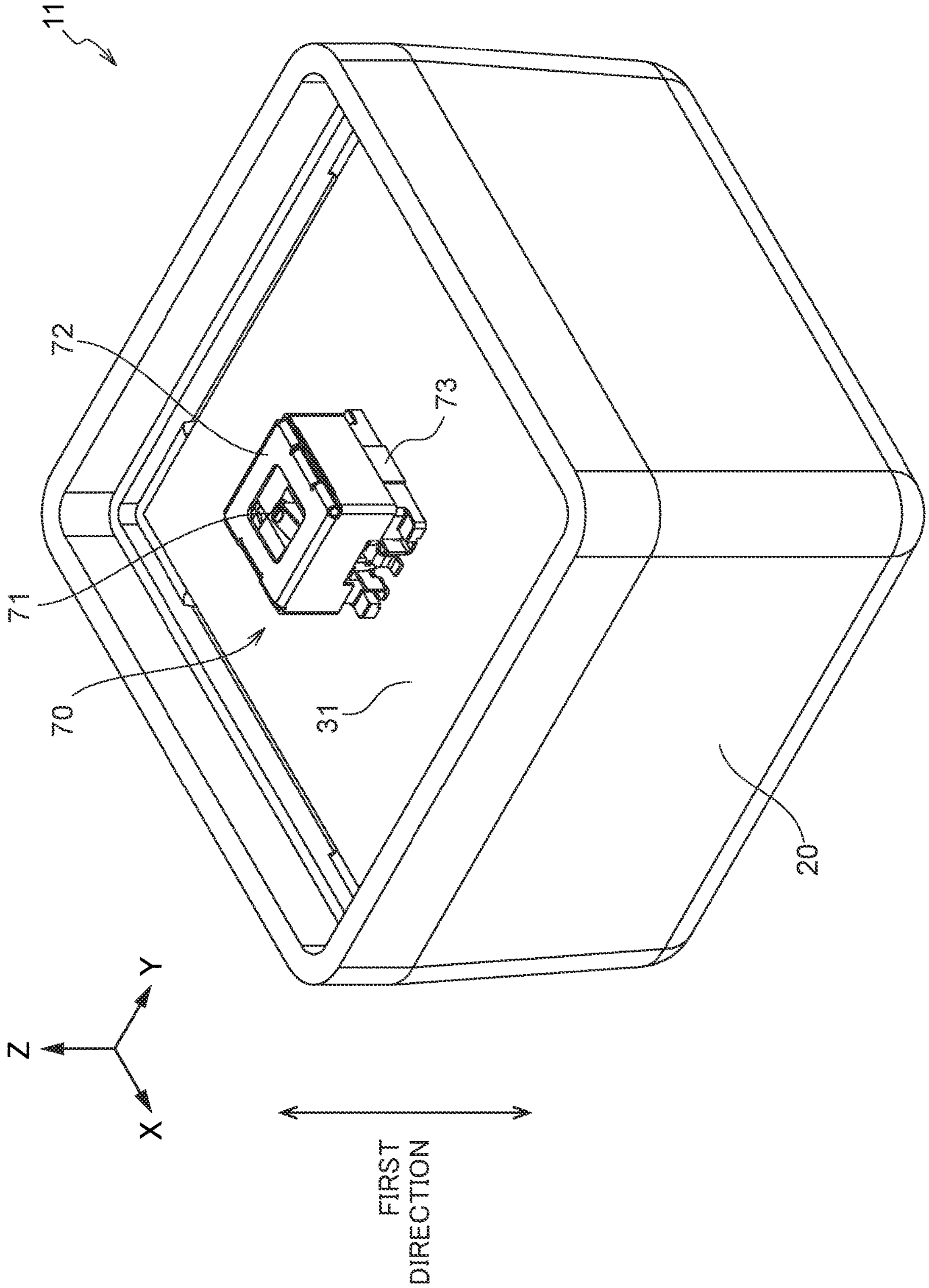
FIG. 4 is a perspective view of the first component as viewed from above.

The internal connector 70 is attached to the upper surface of the internal substrate 31. As illustrated in FIG. 4, the internal connector 70 includes a signal terminal 71, a ground terminal 72, and a connector housing 73. The connector housing 73 is fixed to the internal substrate 31. The ground terminal 72 is elastically supported so as to be movable in the up-down direction with respect to the connector housing 73. The ground terminal 72 is electrically connected to the internal substrate 31 via another ground terminal (not illustrated).

Second Component 12

The second component 12 includes a second housing 40 constituting a "housing", a coaxial connector portion 50, and an internal shell 60.

(Second Housing 40)

The second housing 40 forms a storage space 15 (see FIG. 2) together with the first housing 20 by being attached to the first housing 20 (the other component). The internal connector 70, the internal substrate 31, the imaging element 32, and the like, are stored in the storage space 15. The second housing 40 is formed of an insulator such as a synthetic resin, for example. The second housing 40 has a case body 41 and an external connecting portion 42.

The case body 41 is a part that forms the storage space 15 together with the first housing 20.

Figure 10:
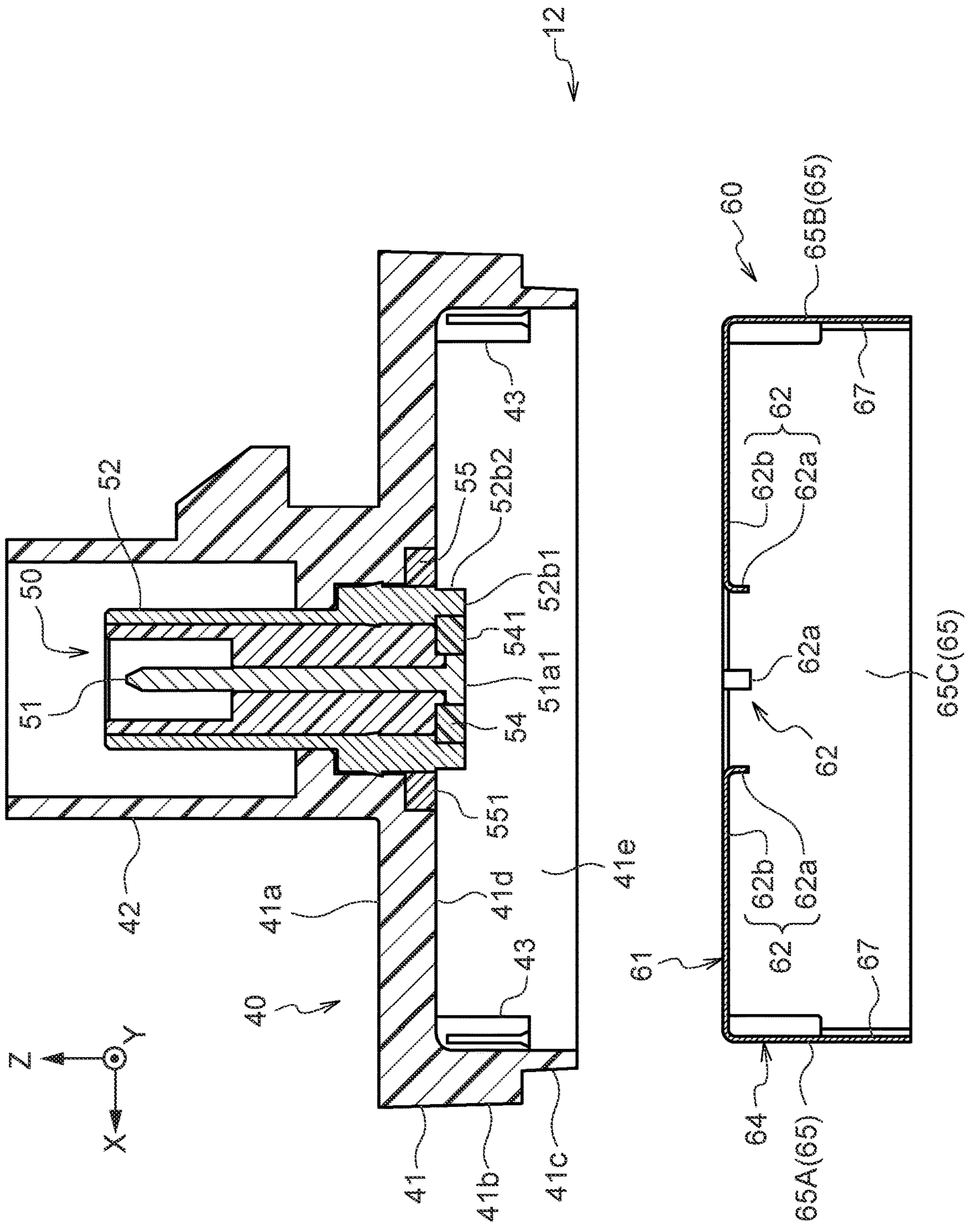
FIG. 10 is an exploded cross-sectional view of the second component that illustrates a state before the internal shell is attached.

The case body 41 has a top wall 41*a* constituting an upper wall of the storage space 15, and a peripheral wall 41*b* constituting a wall of the storage space 15 in a direction perpendicular to the up-down direction. As illustrated in FIG. 10, the top wall 41*a* has a ceiling surface 41*d* constituting a ceiling surface of the storage space 15, and the peripheral wall 41*b* has a side wall surface 41*e* constituting a side wall surface of the storage space 15 in a direction perpendicular to the up-down direction. The top wall 41*a* has a substantially rectangular shape when viewed from above, and the peripheral wall 41*b* has a square cylinder shape.

The external connecting portion 42 is a part that protrudes upward from the top wall 41*a* of the case body 41, and is configured such that an external connector can be fitted thereto.

The second housing 40 is configured such that same can be arranged in a state where the coaxial connector portion 50 passes through in the up-down direction. In other words, the second housing 40 has an arrangement hole 40*a* (see FIG. 9) in which the coaxial connector portion 50 is arranged. The arrangement hole 40*a* is formed so as to pass through both the top wall 41*a* of the case body 41, and the external connecting portion 42, in the up-down direction. The outer conductor 52 of the coaxial connector portion 50 is press-fitted into the arrangement hole 40*a* from below.

The case body 41 has a fitting portion 41*c* that fits into a fitted portion 20*d* (see FIG. 1) of the first housing 20. The fitting portion 41*c* is formed at the lower end of the peripheral wall 41*b*. The fitting portion 41*c* of the second housing 40 is disposed on the inside of the fitted portion 20*d* of the first housing 20. As a result, even in a state before the second housing 40 and the first housing 20 are fixed by welding, adhesion, screws, or the like, the relative position of the second housing 40 in the X and Y directions with respect to the first housing 20 is to some extent determined.

Figure 11:
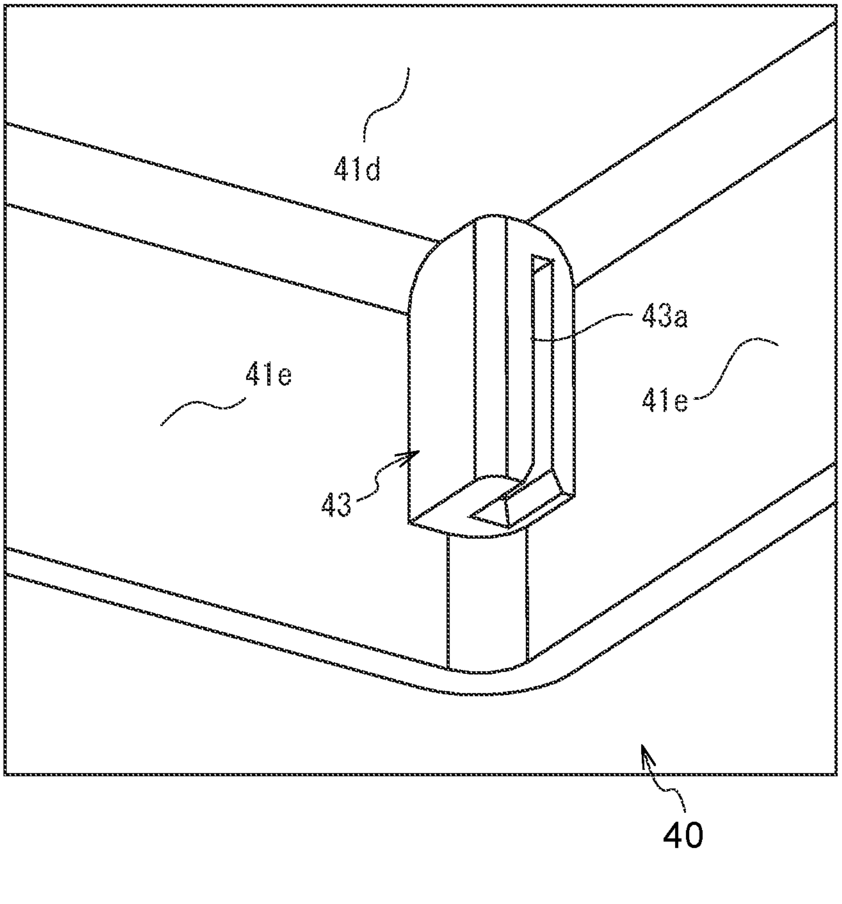
FIG. 11 is an enlarged view illustrating a holding portion of a second housing.

The second housing 40 has a holding portion 43 that holds the internal shell 60. As illustrated in FIG. 11, the holding portion 43 is a part that is formed so as to protrude downward from the ceiling surface 41*d* of the second housing 40 and to protrude from the side wall surface 41*e* of the second housing 40 toward the inside of the storage space 15. The holding portion 43 has a substantially square prism shape. A press-fitting groove 43*a* that extends in the up-down direction is formed in the holding portion 43. A portion of a side plate portion 64 of the internal shell 60 is press-fitted into the press-fitting groove 43*a*. A press-fitting protrusion 66 (see FIG. 5) is formed, as described subsequently, on the side plate portion 64. The lower end of the holding portion 43 is positioned above the lower end of the side wall surface 41*e*.

A plurality of (four) holding portions 43 are formed. Specifically, the ceiling surface 41*d* of the second housing 40 is formed having a substantially rectangular shape, and four holding portions 43 are formed in positions corresponding to the four corners of the substantially rectangular ceiling surface 41*d*.

(Coaxial Connector Portion 50)

Figure 9:
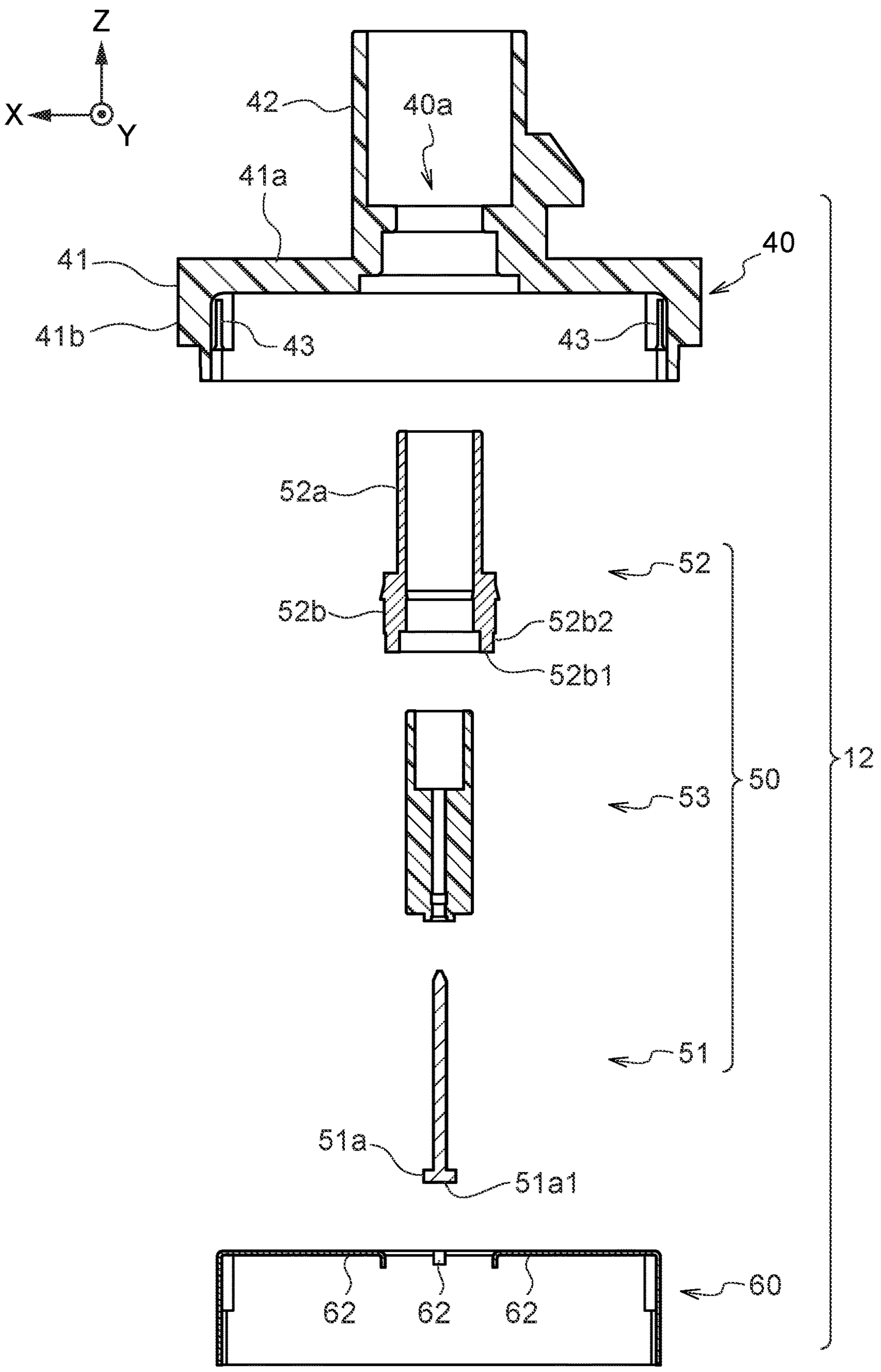
FIG. 9 is an exploded cross-sectional view of the second component.

The coaxial connector portion 50 is a part for electrically connecting an external connector and the internal connector 70. As illustrated in FIG. 9, the coaxial connector portion 50 has an inner conductor 51, an outer conductor 52, and an intermediate insulator 53.

The inner conductor 51 is a pin-shaped terminal and extends along the up-down direction (first direction).

The inner conductor 51 electrically connects a signal terminal of an external connector (not illustrated, first connection object) outside the storage space 15 to a signal terminal 71 of an internal connector 70 (second connection object) inside the storage space 15. The inner conductor 51 has, near its lower end, an enlarged-diameter portion 51*a*. The enlarged-diameter portion 51*a* has a cylinder shape.

The outer conductor 52 has a cylindrical shape and covers the inner conductor 51 from a direction perpendicular to the up-down direction (first direction). The outer conductor 52 is formed by casting or cutting. The vicinity of the upper end of the outer conductor 52 makes contact with the ground terminal of the external connector, and the lower end surface of the outer conductor 52 (an outer conductor contact portion 52*b*1) makes contact with the ground terminal 72 of the internal connector 70.

The outer conductor 52 has an upper portion 52*a* and a lower portion 52*b*. The lower portion 52*b* has an outer diameter larger than that of the upper portion 52*a*. A press-fitting protrusion, which is press-fitted into the second housing 40, is formed on the outer peripheral surface of the lower portion 52*b*.

The outer conductor 52 has a shell contact portion 52*b*2 that makes contact with the internal shell 60. The shell contact portion 52*b*2 is formed at the lower end of the outer peripheral surface of the lower portion 52*b* of the outer conductor 52.

The intermediate insulator 53 has a cylindrical shape and is disposed between the inner conductor 51 and the outer conductor 52. The intermediate insulator 53 functions to hold the inner conductor 51 with respect to the outer conductor 52. The intermediate insulator 53 is press-fitted into the cylindrical outer conductor 52. The inner conductor 51 is press-fitted into the cylindrical intermediate insulator 53 from below.

Figure 3:
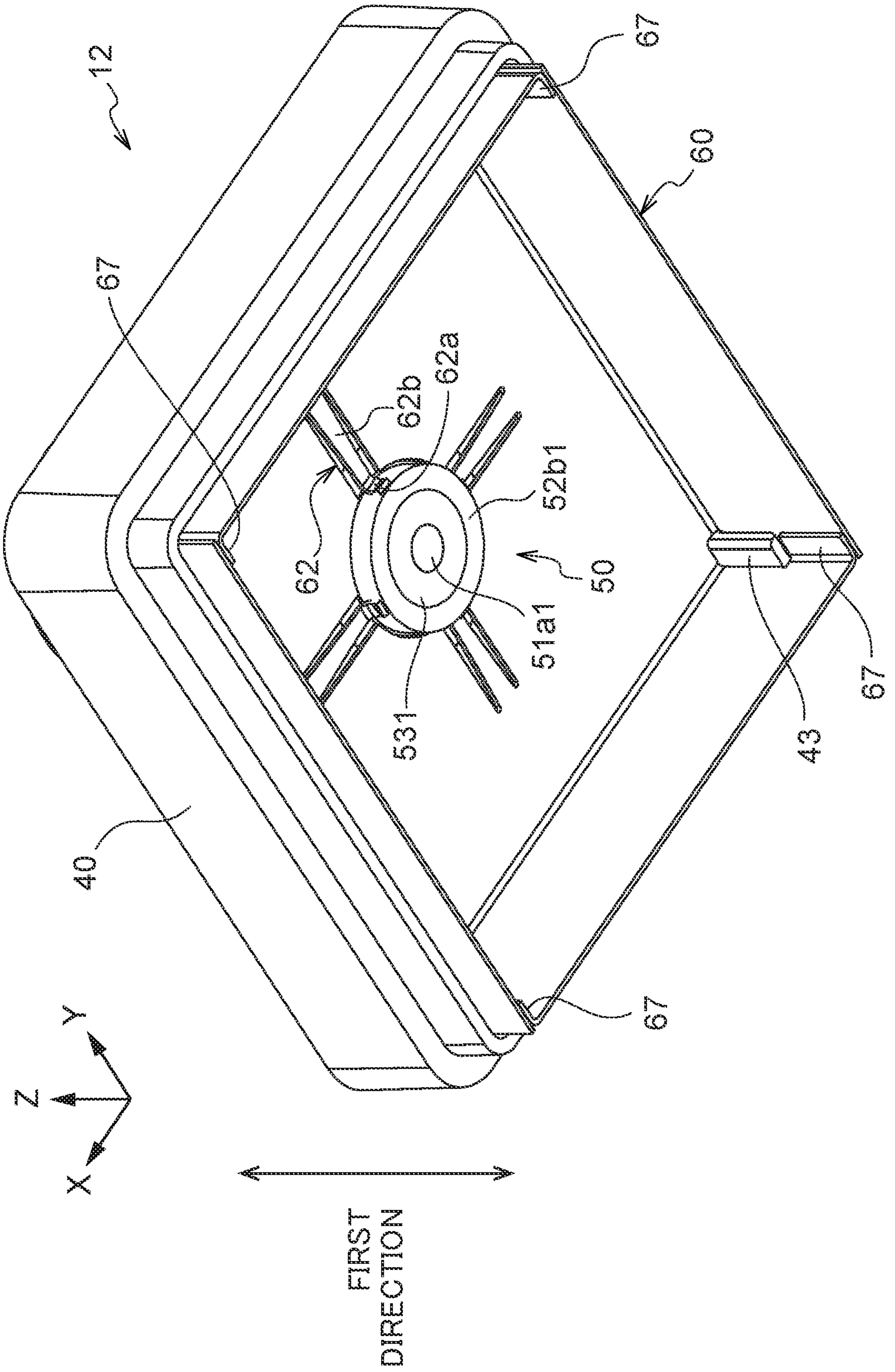
FIG. 3 is a perspective view of the second component as viewed from below.

As illustrated in FIG. 3, the lower end surface of the inner conductor 51 serves as an inner conductor contact portion 51*a*1 that makes contact with the signal terminal 71 of the internal connector 70. The inner conductor contact portion 51*a*1 is a circular plane which has its normal oriented in the −Z direction.

The lower end surface of the outer conductor 52 serves as the outer conductor contact portion 52*b*1, which makes contact with the ground terminal 72 of the internal connector 70. The outer conductor contact portion 52*b*1 is a plane which has its normal oriented in the −Z direction, and extends circumferentially so as to surround the inner conductor contact portion 51*a*1.

As illustrated in FIG. 10, an inner sealing portion 54 is formed, by potting, in a gap between the lower end portion of the inner conductor 51 and the lower end portion of the outer conductor 52. A lower surface 541 of the inner sealing portion 54 smoothly connects the lower end surface of the inner conductor 51 (the inner conductor contact portion 51*a*1) and the lower end surface of the outer conductor 52 (the outer conductor contact portion 52*b*1).

That is, the outer conductor contact portion 52*b*1 of the outer conductor 52, the inner conductor contact portion 51*a*1 of the inner conductor 51, and the lower surface 541 of the inner sealing portion 54 are formed on the same plane which has its normal oriented in the −Z direction. As a result, the contact portions 51*a*1, 541 and 52*b*1 of the coaxial connector portion 50 are formed in a planar shape.

A gap is formed between the outer conductor 52 and the ceiling surface 41*d* of the second housing 40. The outer sealing portion 55 is formed, by potting, in this gap. A lower surface 551 of the outer sealing portion 55 is formed on the same plane as the ceiling surface 41*d* of the second housing 40.

FIG. 10 is a cross-sectional view illustrating a state in which the coaxial connector portion 50 is arranged in the arrangement hole 40*a* of the second housing 40, and the sealing portions 54 and 55 are formed by potting. The sealing portions 54 and 55 prevent water or the like from entering the storage space 15 through the arrangement hole 40*a* of the second housing 40.

When the second component 12 is attached to the first component 11, the coaxial connector portion 50 of the second component 12 makes contact with the signal terminal 71 and the ground terminal 72 of the internal connector 70 from above. As a result, the signal terminal 71 is elastically deformed, and the ground terminal 72 is elastically displaced downward.

(Internal Shell 60)

The internal shell 60 is disposed inside the storage space 15. The internal shell 60 is formed of a conductive material. Specifically, the internal shell 60 is formed by performing punching, bending, and the like on a conductive plate material.

Figure 5:
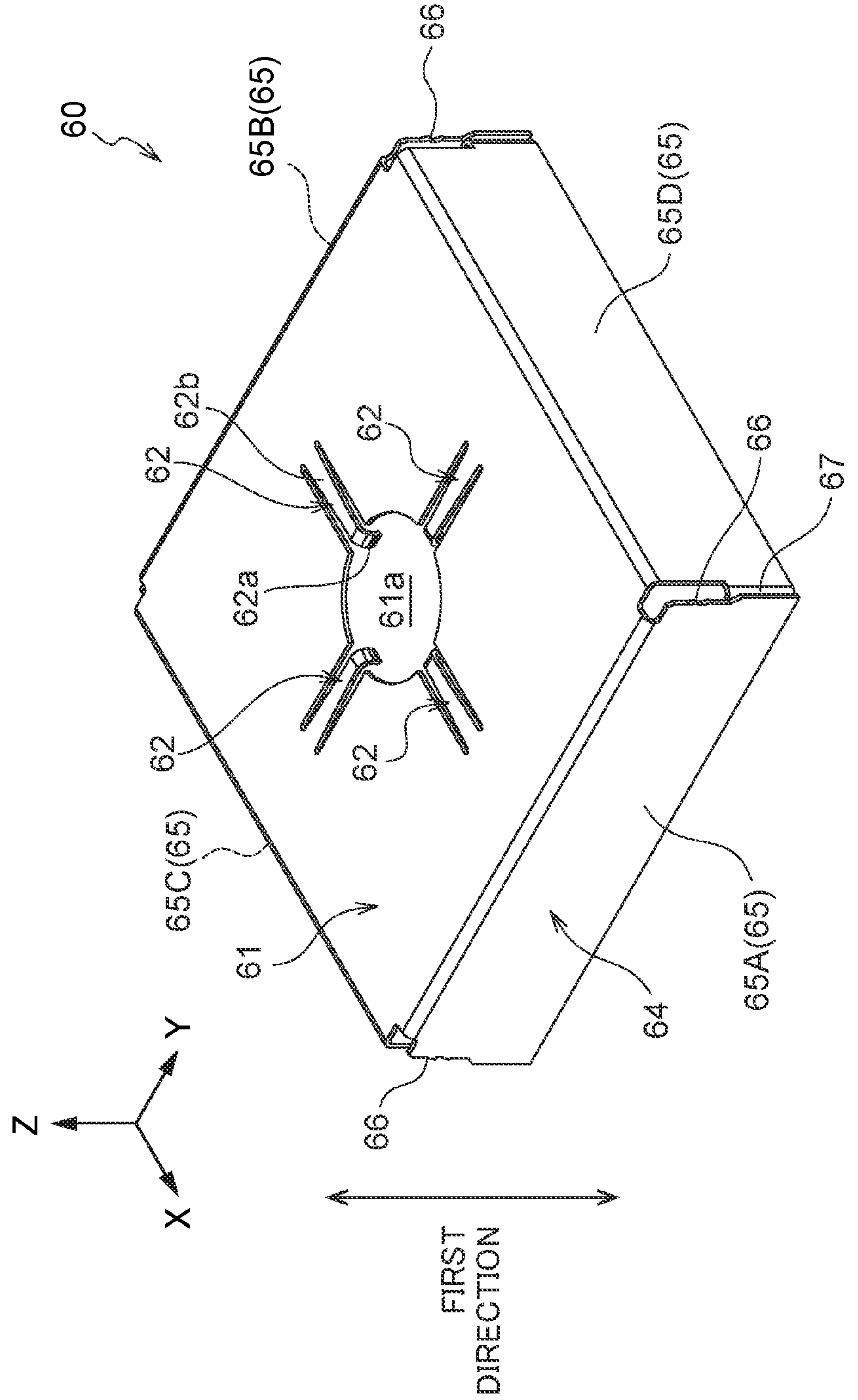
FIG. 5 is a perspective view of an internal shell as viewed from above.

As illustrated in FIG. 5, the internal shell 60 has a top plate portion 61. The top plate portion 61 has a flat plate shape with the plate thickness direction oriented in the Z direction. The top plate portion 61 has a rectangular shape.

The top plate portion 61 is disposed in a position that makes contact with or is close to the ceiling surface 41*d* of the second housing 40.

The top plate portion 61 has an opening 61*a* formed therein. The coaxial connector portion 50 passes through the opening 61*a*. Accordingly, the contact portions 51*a*1, 541 and 52*b*1 of the coaxial connector portion 50 are positioned below the top plate portion 61.

Figure 6:
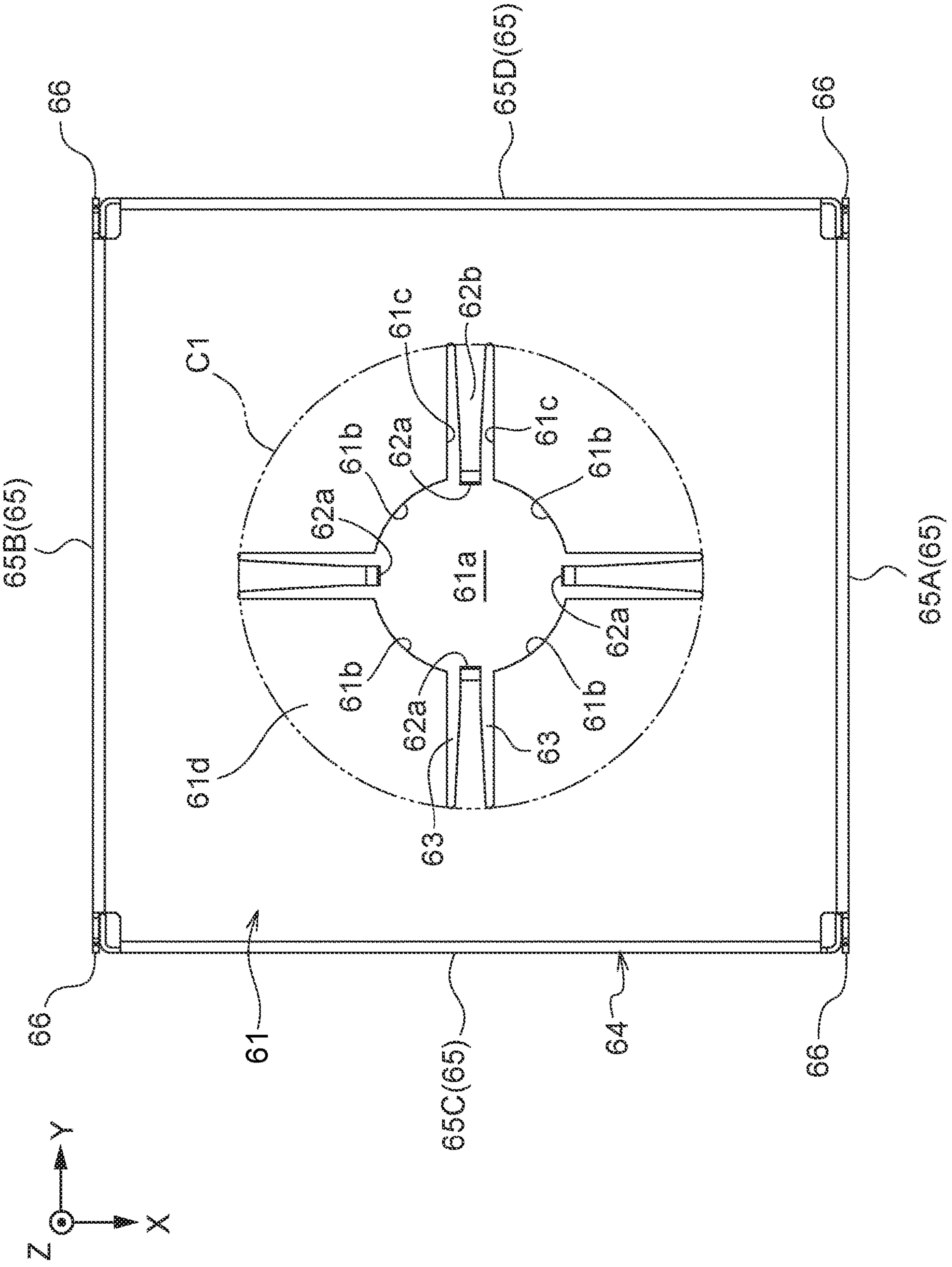
FIG. 6 is a top view of the internal shell.
Figure 7:
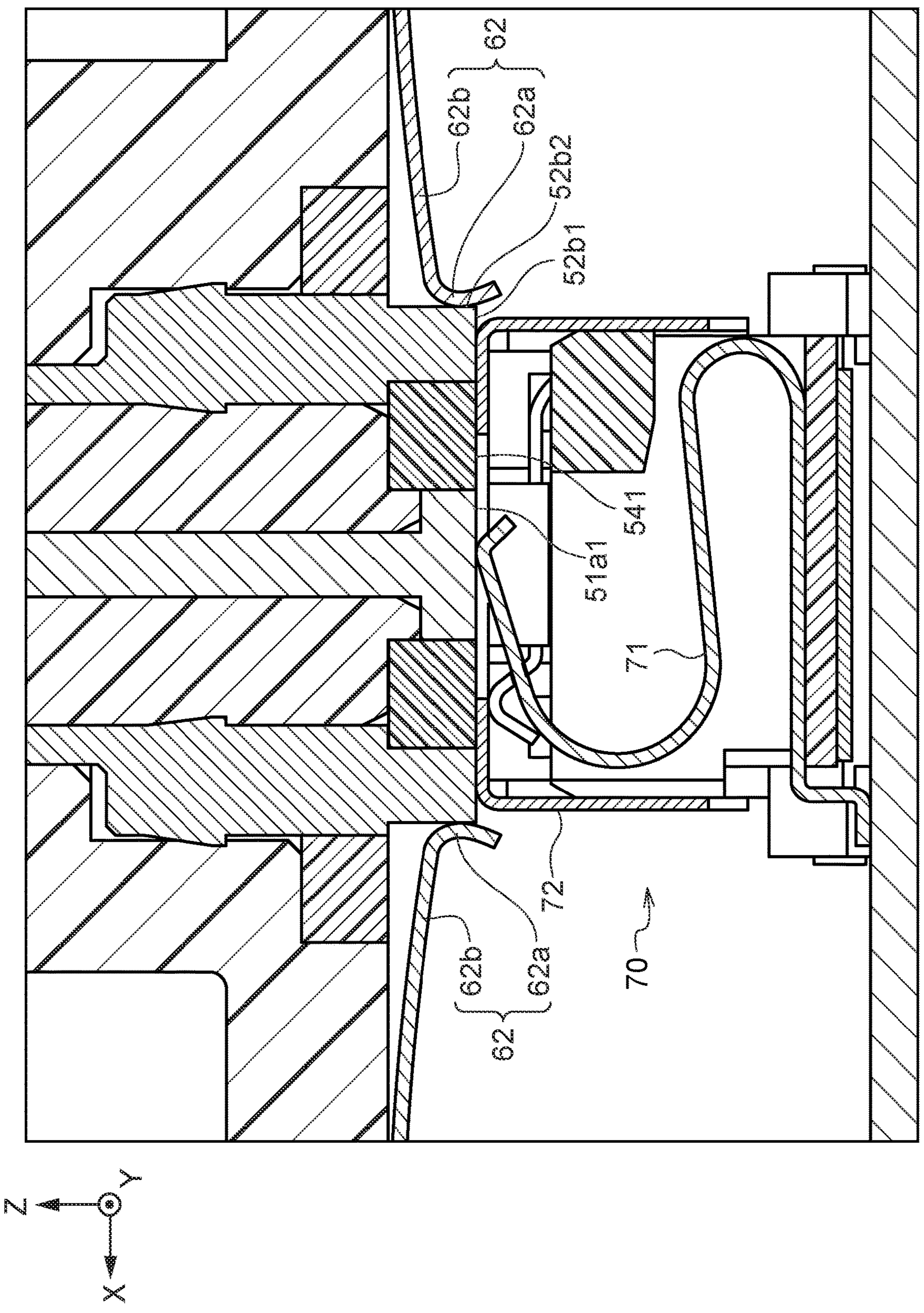
FIG. 7 is an enlarged cross-sectional view of the area of connection between a coaxial connector portion and an internal connector.

As illustrated in FIG. 6, the opening 61*a* is surrounded by a nearby edge 61*b* of the top plate portion 61. The nearby edge 61*b* is separated in a position where a spring piece 62 (described subsequently) is formed. In the present embodiment, because four spring pieces 62 are formed, the nearby edge 61*b* is separated into four parts. Each of the plurality of (four) separated nearby edges 61*b* has a shape conforming to the outer peripheral surface of the outer conductor 52 and has an arc shape. The shape formed by the plurality of nearby edges 61*b* is similar to the cross-section of the lower portion 52*b* of the outer conductor 52, and is specifically circular. The shape (a circular shape in the present embodiment) formed by the plurality of nearby edges 61*b* is slightly larger than the lower portion 52*b* of the outer conductor 52. Therefore, the nearby edge 61*b* is disposed close to the outer peripheral surface of the lower portion 52*b* of the outer conductor 52.

(Spring Piece 62)

The internal shell 60 has four spring pieces 62 that make elastic contact with the outer conductor 52. The four spring pieces 62 make elastic contact with the outer conductor 52, whereby the internal shell 60 and the outer conductor 52 are electrically connected.

Each of the four spring pieces 62 has the same structure. Each of the four spring pieces 62 has a contact portion 62*a* that makes contact with the outer conductor 52, and an elastic support portion 62*b* that elastically supports the contact portion 62*a*. The elastic support portion 62*b* is positioned on the same plane as the top plate portion 61 in a free state. The width of the elastic support portion 62*b* gradually decreases toward the distal end side. The contact portion 62*a* is formed by bending the distal end side of the elastic support portion 62*b* downward.

As illustrated in FIG. 6, a pair of slits 63 is formed on both sides of the elastic support portion 62*b*. The elastic support portion 62*b* is adjacent to the top plate portion 61 (specifically, an extension portion 61*d* to be described subsequently) via the slit 63. An adjacent edge 61*c* is formed at the edge of the opening 61*a*. The adjacent edge 61*c* is adjacent to the elastic support portion 62*b*. The adjacent edge 61*c* is formed outside the shape (a circular shape in the present embodiment) defined by the nearby edge 61*b*. A pair of adjacent edges 61*c* adjacent to one elastic support portion 62*b* are parallel to each other.

The four spring pieces 62 are configured from a front spring piece 62, a rear spring piece 62, a right spring piece 62, and a left spring piece 62.

The elastic support portion 62*b* of the front spring piece 62 extends toward the center of the opening 61*a* when taking, as the proximal end, a front position with respect to the center of the opening 61*a*.

The elastic support portion 62*b* of the rear spring piece 62 extends toward the center of the opening 61*a* when taking, as the proximal end, a rear position with respect to the center of the opening 61*a*.

The elastic support portion 62*b* of the right spring piece 62 extends toward the center of the opening 61*a* when taking, as the proximal end, a right position with respect to the center of the opening 61*a*.

The elastic support portion 62*b* of the left spring piece 62 extends toward the center of the opening 61*a* when taking, as the proximal end, a left position with respect to the center of the opening 61*a*.

That is, the four elastic support portions 62*b* of the four spring pieces 62 extend toward the outer conductor 52 from four positions in directions perpendicular to the up-down direction (first direction), and in a mutually perpendicular direction, with respect to the outer conductor 52.

When the internal shell 60 is attached to the second housing 40 from the state illustrated in FIG. 10, the outer conductor 52 of the coaxial connector portion 50 makes contact with the contact portion 62*a* of the four spring pieces 62. As a result, the elastic support portion 62*b* of the spring piece 62 is deformed, and the contact portion 62*a* is displaced relatively downward with respect to the top plate portion 61. In a state where the second component 12 is completed, the elastic support portion 62*b* is in a deformed state, and the contact portion 62*a* is in an elastic contact state with the shell contact portion 52*b*2 of the outer conductor 52 due to an elastic restoring force.

The two-dot chain line C1 in FIG. 6 is a virtual circle that is centered on the center of the opening 61*a* and that passes through the proximal end of the four spring pieces 62. The top plate portion 61 has a part which is located inside the virtual circle. This part can be understood to be the extension portion 61*d* that extends the shielding range by extending from the proximal end of the spring piece 62 toward the opening 61*a*.

(Side Plate Portion 64)

As illustrated in FIG. 5, the internal shell 60 has a side plate portion 64. The side plate portion 64 shields the storage space 15 from a direction perpendicular to the up-down direction. The side plate portion 64 directs the plate thickness direction in a direction orthogonal to the up-down direction.

The side plate portion 64 is formed by bending the edge of the top plate portion 61 downward. Specifically, the side plate portion 64 is configured from four flat plate portions 65, namely, a front plate portion 65A, a rear plate portion 65B, a right plate portion 65C, and a left plate portion 65D. The lower ends of the four flat plate portions 65 constituting the side plate portion 64 are positioned below the lower end of the second housing 40 (see FIG. 1).

The internal shell 60 has a held portion 66 that is held by the second housing 40.

Specifically, the held portion 66 is a press-fitting protrusion 66 that is formed on the flat plate portion 65 constituting the side plate portion 64. The press-fitting protrusion 66 constituting the held portion 66 is press-fitted into the press-fitting groove 43*a* (see FIG. 11) of the holding portion 43 of the second housing 40.

More specifically, the press-fitting protrusion 66 is formed on the front plate portion 65A and the rear plate portion 65B, and a press-fitting protrusion is not formed on the right plate portion 65C or the left plate portion 65D. The press-fitting protrusion 66 is formed at the plate ends, on both sides in the plate width direction (left-right direction), of the front plate portion 65A and the rear plate portion 65B. Positions where the press-fitting protrusion 66 is formed are the upper portions of the plate ends of the front plate portion 65A and the rear plate portion 65B in the plate width direction (both right and left sides), and the press-fitting protrusion 66 is not formed at the lower portions of these plate ends.

As illustrated in FIG. 3, a bent portion 67, which is bent toward the inside of the internal shell 60, is formed starting from the lower portions of the plate ends of the right plate portion 65C and the left plate portion 65D on both sides in the plate width direction (front-rear direction). The bent portion 67 is disposed on the inside (on the inside in the front-rear direction) of adjacent flat plate portions 65 (the front plate portion 65A and the rear plate portion 65B in the present embodiment). Thus, the gap between the adjacent flat plate portions 65 is shielded.

Actions and Effects

Next, the actions and effects of the present embodiment will be described.

In the present embodiment, the second component 12 constituting an "electronic component" includes the second housing 40, the inner conductor 51, the outer conductor 52, and the internal shell 60. The second housing 40 forms the storage space 15 together with the first housing 20 by being attached to the first housing 20. The inner conductor 51 extends along the up-down direction and electrically connects an external connector (the first connection object) outside the storage space 15 to the internal connector 70 inside the storage space 15. The outer conductor 52 has a cylindrical shape and annularly surrounds the inner conductor 51 and extends in the first direction. The internal shell 60 is disposed inside the storage space 15 and electrically connected to the outer conductor 52.

Here, the internal shell 60 has the spring piece 62 that makes elastic contact with the outer conductor 52. Therefore, it is possible to ensure a favorable electrical connection between the internal shell 60 and the outer conductor 52 without joining the internal shell 60 and the outer conductor 52.

Furthermore, in the present embodiment, the spring piece 62 has the contact portion 62*a* that makes contact with the outer conductor 52, and the elastic support portion 62*b* that supports the contact portion 62*a*.

Here, the elastic support portion 62*b* extends in a direction perpendicular to the up-down direction. Therefore, it is possible to ensure, for the elastic support portion 62*b*, a spring length necessary for displacement of the contact portion 62*a* without increasing the size of the internal shell 60 in the up-down direction.

Here, in the present embodiment, the internal shell 60 has four spring pieces 62. Further, the four elastic support portions 62*b* of the four spring pieces 62 extend toward the outer conductor 52 from four positions in directions perpendicular to the up-down direction, and in mutually perpendicular directions, with respect to the outer conductor 52.

Therefore, a favorable electrical connection between the internal shell 60 and the outer conductor 52 can be more reliably ensured.

Further, in the present embodiment, the contact portion 62*a* is formed by bending the distal end side of the elastic support portion 62*b* inward in the first direction (toward the second connection object in the first direction). Therefore, it is easy to attach the internal shell 60 to the outer conductor 52 from the inside in the first direction.

Further, in the present embodiment, the internal shell 60 has the top plate portion 61 along a plane perpendicular to the up-down direction. Furthermore, the spring piece 62 includes the contact portion 62*a* that makes contact with the outer conductor 52, and the elastic support portion 62*b* that supports the contact portion 62*a*.

Here, the elastic support portion 62*b* extends from the top plate portion 61 in a direction perpendicular to the up-down direction. Therefore, the top plate portion 61 and the elastic support portion 62*b* are located on substantially the same plane.

Accordingly, when the internal shell 60 has the top plate portion 61, the spring length necessary for displacement of the contact portion 62*a* can be ensured for the elastic support portion 62*b* without increasing the size of the internal shell 60 in the up-down direction.

Furthermore, in the present embodiment, the top plate portion 61 has the opening 61*a* formed therein through which the outer conductor 52 passes. Here, the contact portion 62*a* is formed by bending the distal end side of the elastic support portion 62*b* inward in the first direction. The contact portion 62*a* and the outer conductor 52 make contact, on the inside in the first direction, relative to the top plate portion 61.

Therefore, it is not necessary to secure a space for the contact portion 62*a* and the outer conductor 52 to make contact on the outside (upper side) in the first direction of the top plate portion 61, and the entire second component 12 can be downsized.

Further, in the present embodiment, the top plate portion 61 has the extension portion 61*d* that extends from the proximal end of the spring piece 62 toward the opening 61*a* so as to extend the shielding range.

Therefore, a wide range can be shielded by the internal shell 60.

Furthermore, in the present embodiment, the internal shell 60 has the held portion 66 that is held by the second housing 40.

Therefore, the internal shell 60 is appropriately held in comparison with an embodiment in which the internal shell 60 does not have the held portion 66.

Note that, because the internal shell 60 is held by the second housing 40, the position of the internal shell 60 is affected by the second housing 40, and the positional relationship between the internal shell 60 and the outer conductor 52 may deviate from the desired positional relationship. However, because the internal shell 60 has the spring piece 62, a favorable electrical connection between the internal shell 60 and the outer conductor 52 is ensured even when the positional relationship between the internal shell 60 and the outer conductor 52 deviates from the desired positional relationship.

Further, in the present embodiment, the internal shell 60 includes the top plate portion 61 along a plane perpendicular to the up-down direction, and the side plate portion 64 formed by bending an end portion of the top plate portion 61 inward in the first direction. Further, the held portion 66 is formed by forming, on the side plate portion 64, the press-fitting protrusion 66 that is press-fitted into the second housing 40.

Thus, the internal shell 60 can be held by the second housing 40 while suppressing increased complexity of the shape of the internal shell 60.

Supplementary Description of the Foregoing Embodiments

Note that the present disclosure is not limited to the foregoing embodiments. A supplement is provided hereinbelow just in case.

In the foregoing embodiments, an example in which the outer conductor 52 is formed by cutting or casting has been described. However, the "outer conductor" of the present disclosure is not limited thereto, and may be made of a plate material, for example.

In the foregoing embodiments, an example in which the second housing 40 constituting the "housing" is formed of an insulator such as a synthetic resin has been described. However, the "housing" of the present disclosure is not limited to the foregoing.

In the foregoing embodiments, an example has been described in which the outer conductor contact portion 52*b*1 of the outer conductor 52 and the inner conductor contact portion 51*a*1 of the inner conductor 51 are formed on the same plane. However, the outer conductor and the inner conductor of the present disclosure are not limited to the foregoing arrangement.

In the foregoing embodiment, the second component 12 (electronic component) including one inner conductor 51 has been described. Nonetheless, the electronic components of the present disclosure are not limited to the foregoing, rather, two or more inner conductors may be provided.

REFERENCE SIGNS LIST

10 Camera module
11 First component
12 Second component (electronic component)
15 Storage space
20 First housing (the other component)
40 Second housing (housing)
40*a* Arrangement hole
41 Case body
43 Holding portion
43*a* Press-fitting groove
50 Coaxial connector portion
51 Inner conductor
52 Outer conductor
60 Internal shell
61 Top plate portion (first plate portion)
61*a* Opening
62 Spring piece
62*a* Contact portion
62*b* Elastic support portion
64 Side plate portion
66 Press-fitting protrusion (held portion)
70 Internal connector (second connection object)

What is claimed is:

1. An electronic component, comprising:

a housing that is attached to another component to form a storage space together with the other component;

an inner conductor that extends along a first direction and electrically connects a first connection object outside the storage space and a second connection object inside the storage space;

a cylindrical outer conductor that annularly surrounds the inner conductor and extends in the first direction; and an internal shell that is disposed inside the storage space and is electrically connected to the outer conductor, wherein the internal shell has a spring piece that makes elastic contact with the outer conductor, wherein the spring piece has:

a contact portion that makes contact with the outer conductor, and an elastic support portion that supports the contact portion, wherein the elastic support portion extends in a direction perpendicular to the first direction, wherein when the internal shell is electrically connected to the outer conductor, the elastic support portion is in a state of elastic deformation and displaced toward the second connection object in the first direction.

2. The electronic component according to claim 1, wherein the internal shell has four spring pieces each having an elastic support portion, and wherein the elastic support portions of the four spring pieces extend toward the outer conductor from four positions in directions perpendicular to the first direction, and in mutually perpendicular directions, with respect to the outer conductor.

3. The electronic component according to claim 1, wherein the contact portion is formed by bending a distal end side of the elastic support portion toward the second connection object in the first direction.

4. An electronic component, comprising:
a housing that is attached to another component to form a storage space together with the other component;
an inner conductor that extends along a first direction and electrically connects a first connection object outside the storage space and a second connection object inside the storage space;
a cylindrical outer conductor that annularly surrounds the inner conductor and extends in the first direction; and
an internal shell that is disposed inside the storage space and is electrically connected to the outer conductor,
wherein the internal shell has a spring piece that makes elastic contact with the outer conductor
wherein the internal shell has a first plate portion along a plane perpendicular to the first direction,
wherein the spring piece has:
a contact portion that makes contact with the outer conductor; and
an elastic support portion that supports the contact portion,
wherein the elastic support portion extends from the first plate portion in a direction perpendicular to the first direction,
wherein the first plate portion has an opening formed therein through which the outer conductor passes, and
wherein the first plate portion has an extension portion that extends from a proximal end of the spring piece toward the opening so as to extend a shielding range.

5. The electronic component according to claim 4, wherein the contact portion is formed by bending a distal end side of the elastic support portion toward the second connection object in the first direction, and wherein the contact portion and the outer conductor make contact, on a second connection object side relative to the first plate portion.

6. An electronic component, comprising:
a housing that is attached to another component to form a storage space together with the other component;
an inner conductor that extends along a first direction and electrically connects a first connection object outside the storage space and a second connection object inside the storage space;
a cylindrical outer conductor that annularly surrounds the inner conductor and extends in the first direction; and
an internal shell that is disposed inside the storage space and is electrically connected to the outer conductor,
wherein the internal shell has a spring piece that makes elastic contact with the outer conductor,
wherein the internal shell has a held portion that is held by the housing; and
wherein the internal shell has:
a first plate portion along a plane perpendicular to the first direction; and
a side plate portion formed by bending an end portion of the first plate portion toward the second connection object in the first direction, and
wherein the held portion is formed by forming, on the side plate portion, a press-fitting protrusion that is press-fitted into the housing.

7. An electronic component, comprising:
a housing that is attached to another component to form a storage space together with the other component;
an inner conductor that extends along a first direction and electrically connects a first connection object outside the storage space and a second connection object inside the storage space;
a cylindrical outer conductor that annularly surrounds the inner conductor and extends in the first direction; and
an internal shell that is disposed inside the storage space and is electrically connected to the outer conductor,
wherein the internal shell has a spring piece that makes elastic contact with the outer conductor,
wherein inner conductor includes an inner conductor contact portion that contacts a signal terminal of an internal connector, which serves as the second connection object;
the inner conductor contact portion is a plane with its normal direction oriented toward the second connection object in the first direction;
the outer conductor includes an outer conductor contact portion that contacts a ground terminal of the internal connector; the outer conductor contact portion is a plane with its normal direction oriented toward the second connection object in the first direction and extends so as to surround the inner conductor contact portion;
a gap between the end of the inner conductor on the second connection object side in the first direction and the end of the outer conductor on the second connection object side in the first direction is filled with an inner sealing portion formed by potting; and
the outer conductor contact portion, the inner conductor contact portion, and the surface of the inner sealing portion on the second connection object side are formed on the same plane, with the normal direction oriented toward the second connection object in the first direction.

* * * * *